United States Patent
Hsu (10) Patent No.: US 8,310,847 B2
(45) Date of Patent: Nov. 13, 2012

(54) SECONDARY SIDE POST REGULATOR OF FLYBACK POWER CONVERTER WITH MULTIPLE OUTPUTS

(75) Inventor: Ta-Ching Hsu, Sijhih (TW)

(73) Assignee: Niko Semiconductor Co., Ltd., Taipei (TW)

( * ) Notice: Subject to any disclaimer, the term of this patent is extended or adjusted under 35 U.S.C. 154(b) by 350 days.

(21) Appl. No.: 12/461,178

(22) Filed: Aug. 4, 2009

(65) Prior Publication Data

US 2011/0032732 A1 Feb. 10, 2011

(51) Int. Cl.
*H02M 3/335* (2006.01)
*G05F 1/577* (2006.01)

(52) U.S. Cl. .................... 363/21.14; 363/21.18; 323/267

(58) Field of Classification Search .................. 323/267, 323/266; 363/21.06, 21.12, 21.14, 21.18, 363/70, 67, 89
See application file for complete search history.

(56) References Cited

U.S. PATENT DOCUMENTS

| | | | | |
|---|---|---|---|---|
| 6,128,203 A * | 10/2000 | Canizales Teran | ........ | 363/21.06 |
| 6,304,461 B1 * | 10/2001 | Walker | ............................ | 363/17 |
| 6,385,058 B1 * | 5/2002 | O'Meara | ..................... | 363/21.01 |
| 7,113,413 B1 * | 9/2006 | Khasiev | ...................... | 363/21.14 |
| 7,515,442 B2 * | 4/2009 | Mikulenka et al. | ........ | 363/21.12 |
| 7,706,155 B1 * | 4/2010 | Bell et al. | ......................... | 363/17 |
| 7,817,447 B2 * | 10/2010 | Huynh | ....................... | 363/21.12 |
| 2005/0213354 A1 * | 9/2005 | Pai | .............................. | 363/21.06 |
| 2007/0263421 A1 * | 11/2007 | Kyono | .......................... | 363/127 |
| 2008/0253150 A1 * | 10/2008 | Wingrove et al. | .......... | 363/21.14 |
| 2010/0253307 A1 * | 10/2010 | Chen et al. | ..................... | 323/283 |

* cited by examiner

*Primary Examiner* — Adolf Berhane
*Assistant Examiner* — Fred E Finch, III
(74) *Attorney, Agent, or Firm* — Rosenberg, Klein & Lee (57) ABSTRACT

A flyback power converter with multiple outputs has a transformer, a low-voltage output circuit, a high-voltage output circuit, and a secondary side post regulator circuit is provided. The transformer has a first secondary winding and a second secondary winding. The low-voltage output circuit has a low-voltage output capacitor and a rectifier unit, and is coupled to the first secondary winding to generate a low voltage output. The high-voltage output circuit has a high-voltage output switch and a high-voltage output capacitor, and is coupled to the second secondary winding to generate a high voltage output. The secondary side post regulator circuit adjusts on-time of the high-voltage output switch according to a feedback signal to have the energy stored in the high-voltage capacitor transmitted to the low-voltage capacitor to lower down the voltage level of the high output voltage.

24 Claims, 7 Drawing Sheets

SECONDARY SIDE POST REGULATOR OF FLYBACK POWER CONVERTER WITH MULTIPLE OUTPUTS

BACKGROUND OF THE INVENTION

1. Field of the Invention

This invention relates to a flyback power converter with multiple outputs, and more particularly relates to a flyback power converter with output voltage being regulated by using a post regulator.

2. Description of Related Art

Power converters with multiple outputs have been widely applied to various electronic products, such as monitor, mini PC, set-top-box (STB), media player, game player, and etc. The demand of such power converters is large and the market keeps growing. However, the rising of oil price and the increasing of environmental consciousness result in more and more regulations about power saving and energy efficiency, which challenges the manufacturers of such power converters. Among these regulations, the mandatory Appliance Efficiency Regulations adopted by California Energy Commission (CEC) on December 2004 and the 80Plus program focusing on the development of desktop computers and servers are most important.

Figure 1:
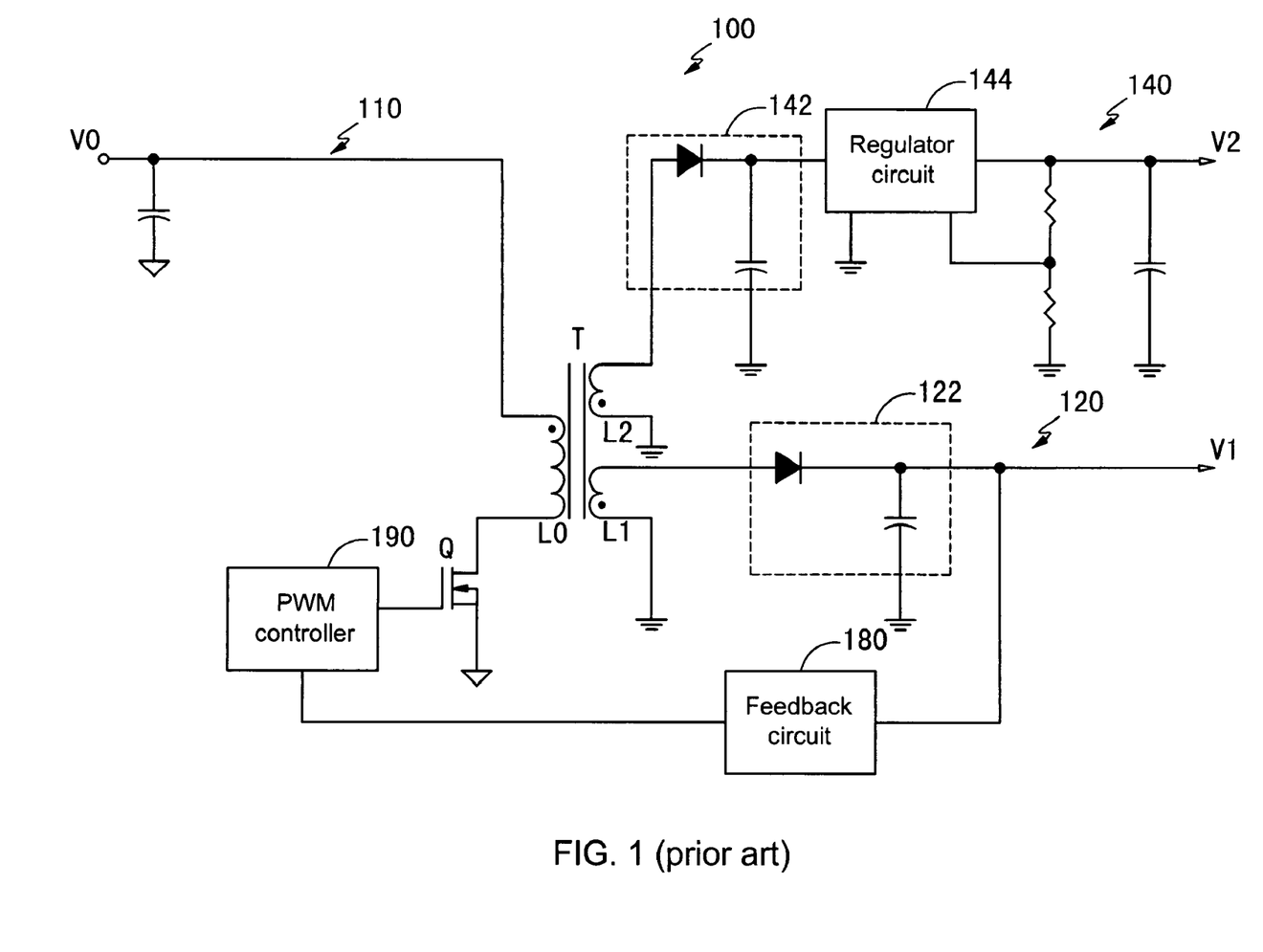
FIG. 1 is a circuit diagram of a typical flyback power converter with multiple outputs.

FIG. 1 is a circuit diagram of a typical flyback power converter with multiple outputs 100. As shown, the flyback power converter 100 has a transformer T, which is composed of a primary winding L0, a first secondary winding L1, and a second secondary winding L2. The primary winding L0 is connected to a primary side circuit 110 for accessing an input voltage V0. The first secondary winding L1 is connected to a first output circuit 120 for generating a first output voltage V1. The second secondary winding L2 is connected to a second output circuit 140 for generating a second output voltage V2. The voltage levels of the first output voltage V1 and the second output voltage V2 depend on the number of windings of the first secondary winding L1 and that of the second secondary winding L2.

The primary side circuit 110 has a main switch Q connected between the primary winding L0 and a ground for adjusting the power transmitted from the power input to the transformer T. The first output circuit 120 has a rectifier 122 coupled to the first secondary winding L1. The voltage level of the output voltage V1 of the first output circuit 120 corresponds to the voltage drop across the capacitor of the rectifier 122. The second output circuit 140 also has a rectifier 142 coupled to the second secondary winding L2.

As to the feedback control of the first output circuit 120, the flyback power converter 100 has a feedback circuit 180 and a pulse width modulation (PWM) controller 190. The feedback circuit 180 detects the first output voltage V1 and generates a main feedback signal to the PWM controller 190 accordingly. The PWM controller 190 generates a modulation signal according to the main feedback signal to control on-time of the main switch Q so as to adjust the power accessed by the transformer T and stabilize the level of the first output voltage V1. However, because the second output voltage V2 can not be stabilized by the main feedback signal, the level of the second output voltage V2 would be shifted attending with the variation of input power and output load. For example, the increasing of current outputted from the second output circuit 140 may result in voltage drop of the second output voltage V2; and the increasing of current outputted from the first output circuit 120 may result in the increasing of duty cycle of the main switch Q to raise the level of the second output voltage V2.

In order to stabilize the output voltage other than the main output voltage V1, referring to FIG. 1, the second output circuit 140 of the power converter 100 adopts a regulator circuit 144, such as a linear drop-out (LDO) circuit, serially connected to the rectifier 142 to stabilize the output voltage V2. However, the regulator circuit 144 causes significant energy loss during voltage stabilization. The power converters with such circuit design may encounter poor energy efficiency or even be disqualified for the energy regulations. In addition, as the first output circuit 120 is heavily loaded, the voltage level transmitted to the regulator circuit 144 is enhanced and the potential difference between the input and the output of the regulator circuit 144 is increased, which may result in a greater energy loss during voltage-stabilization.

Accordingly, how to provide multiple outputs with stabilized voltage level and prevent the increasing of energy loss, is an urgent issue to be solved.

SUMMARY OF THE INVENTION

It is a main object of the present invention to solve the problem of voltage-stabilizing difficulty about the output without being controlled by the main feedback loop of the power converter with multiple outputs.

It is another object of the present invention to reduce energy loss of the power converter with multiple outputs.

A flyback power converter with multiple outputs is provided in an embodiment of the present invention. The flyback power converter has a transformer, a primary side circuit, a low-voltage output circuit, a high-voltage output circuit, and a secondary side post regulator circuit. The transformer has a primary winding, a first secondary winding, and a second secondary winding. The primary side circuit has a main switch coupled to the primary winding. The low-voltage output circuit, which is coupled to the first secondary winding, has a low-voltage output capacitor and a rectifier unit for generating a low output voltage. The high-voltage output circuit, which is coupled to the second secondary winding, has a high-voltage output switch and a high-voltage output capacitor for generating a high output voltage. The secondary side post regulator circuit is utilized to adjust an on-time of the high-voltage output switch according to a feedback signal respective to the high output voltage so as to have the energy stored in the high-voltage capacitor transferred to the low-voltage output capacitor for reducing the level of the high output voltage.

In accordance with an embodiment of the present invention, the secondary side post regulator circuit decides the upper limit of on-time of the high-voltage output switch according to a detecting signal from the low-voltage output circuit. The detecting signal may be a voltage drop across the rectifier diode of the low-voltage output circuit or a gate voltage of the rectifier switch of the low-voltage output circuit.

A secondary side post regulator circuit applied in a flyback power converter with multiple outputs is also provided in another embodiment of the present invention. The flyback power converter with multiple outputs has a transformer, a low-voltage output circuit for generating a low output voltage, and a high-voltage output circuit for generating a high output voltage, wherein the low-voltage output circuit has a low-voltage output capacitor and a rectifier unit and is coupled to a first secondary winding of the transformer, and the high-voltage output circuit has a high-voltage output capacitor and a high-voltage output switch and is coupled to a second secondary winding. The secondary side post regulator circuit has a ramp generator and a comparator. The ramp generator is utilized to generate a ramp signal according to a detecting signal from the low-voltage output circuit. The comparator is utilized to generate an on-time signal to control an on-time of the high-voltage output switch according to the ramp signal and a feedback signal from the high-voltage output circuit so as to have the energy stored in the high-voltage output capacitor transferred to the low-voltage output capacitor through the conducted high-voltage output switch.

In accordance with an embodiment of the present invention, the secondary side post regulator circuit has a transforming circuit for transforming the feedback signal into a feedback voltage, which has a level positively related to that of the feedback signal. The comparator receives the ramp signal and the feedback voltage to generate the on-time signal.

In accordance with an embodiment of the present invention, the secondary side post regulator circuit has an AND gate, which receives the on-time signal and the detecting signal to generate a conduction signal to control the high-voltage output switch.

BRIEF DESCRIPTION OF THE DRAWINGS

The present invention will now be specified with reference to its preferred embodiment illustrated in the drawings, in which.

DETAILED DESCRIPTION OF THE PREFERRED EMBODIMENTS

Figure 2:
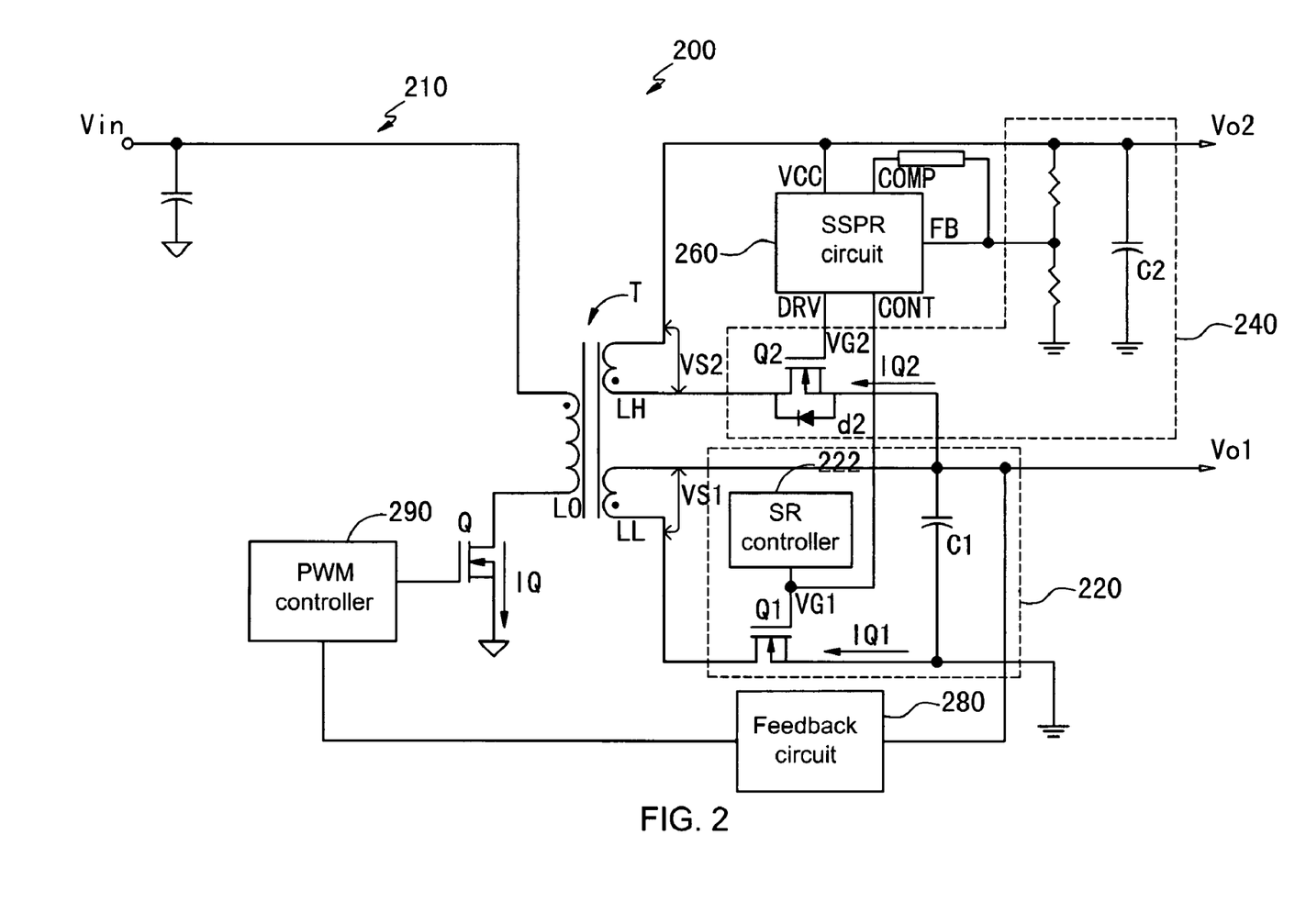
FIG. 2 is a circuit diagram of a flyback power converter with multiple outputs in accordance with a preferred embodiment of the present invention.

FIG. 2 is a circuit diagram of a flyback power converter with multiple outputs 200 in accordance with an embodiment of the present invention. In the present embodiment, a flyback power converter 200 with two different outputs Vo1 and Vo2 is described. However, the scope of the present invention should not be restricted thereto. The idea of the present invention can be adopted in the power converters with more than three outputs of different voltage levels.

As shown, the flyback power converter with multiple outputs 200 in accordance with the present embodiment has a transformer T, a primary side circuit 210, a low-voltage output circuit 220, a high-voltage output circuit 240, and a secondary side post regulator (SSPR) circuit 260. The transformer T has a primary winding L0, a first secondary winding LL, and a second secondary winding LH. Wherein the primary winding L0 is coupled to the primary side circuit 210, which has a main switch Q connected between the primary winding L0 and a ground for adjusting the power transmitted from the power input Vin to the transformer T.

The low-voltage output circuit 220, which has a low-voltage output switch Q1, a low-voltage output capacitor C1, and a synchronous rectifier (SR) controller 222, is coupled to the first secondary winding LL for generating a low output voltage Vo1. The low-voltage output switch Q1 acts as a rectifier unit controlled by the synchronous rectifier controller 222. In the present embodiment, the low-voltage output switch Q1 is connected between the first secondary winding LL and a ground. However, the present invention should not be so limited. According to another embodiment, the low-voltage output switch Q1 may be connected between the first secondary winding LL and a high level side of the low-voltage output capacitor C1.

The high-voltage output circuit 240, which has a high-voltage output switch Q2 and a high-voltage output capacitor C2, is coupled to the second secondary winding LH for generating a high output voltage Vo2. The voltage levels of the low output voltage Vo1 and the high output voltage Vo2 depends on the winding ratio of the first secondary winding LL and the second secondary winding LH of the transformer T.

As to the stabilization for the low output voltage V1, the low output voltage Vo1 is feedback controlled through the main feedback loop of the flyback power converter 200. As shown, the low-voltage output circuit 220 at the secondary side is coupled to the primary side circuit 210 through a feedback circuit 280. The feedback circuit 280 detects the low output voltage Vo1 and generates a main feedback signal to the PWM controller 290. The PWM controller 290 receives the main feedback signal and generates a modulation signal accordingly to control on-time of the main switch Q so as to adjust the energy transmitted to the transformer T.

In contrast with the low output voltage Vo1, which can be stabilized by the main feedback loop, the high output voltage Vo2 of the present embodiment is regulated by using the secondary side post regulator circuit 260. As shown, the secondary side post regulator circuit 260 adjusts on-time of the high-voltage output switch Q2 according to a feedback signal FB from the high-voltage output circuit 240 and a detecting signal CONT from the low-voltage output circuit 220. Wherein, the feedback signal, which has a voltage level positively related to that of the high output voltage Vo2, is utilized to represent the condition of the high output voltage Vo2, and the detecting signal CONT, which shows the condition of the low-voltage switch Q1, is utilized for judging whether the first secondary winding LL is charging the low-voltage output capacitor C1.

In the present embodiment, the detecting signal CONT is corresponded to the gate voltage of the low-voltage output switch Q1. That is, as the low-voltage output switch Q1 is turned on to represent that the first secondary winding LL is charging the low-voltage output capacitor C1, the detecting signal CONT is high. The secondary side post regulator circuit 260 turns on the high-voltage output switch Q2 only when the detecting signal CONT is high. In addition, on-time of the high-voltage output switch Q2 is positively related to the voltage level of the feedback signal FB. The higher the level of the high output voltage Vo2, the longer the high-voltage output switch Q2 being turned on to have more energy transferred to the low-voltage output circuit 220.

Figure 2A:
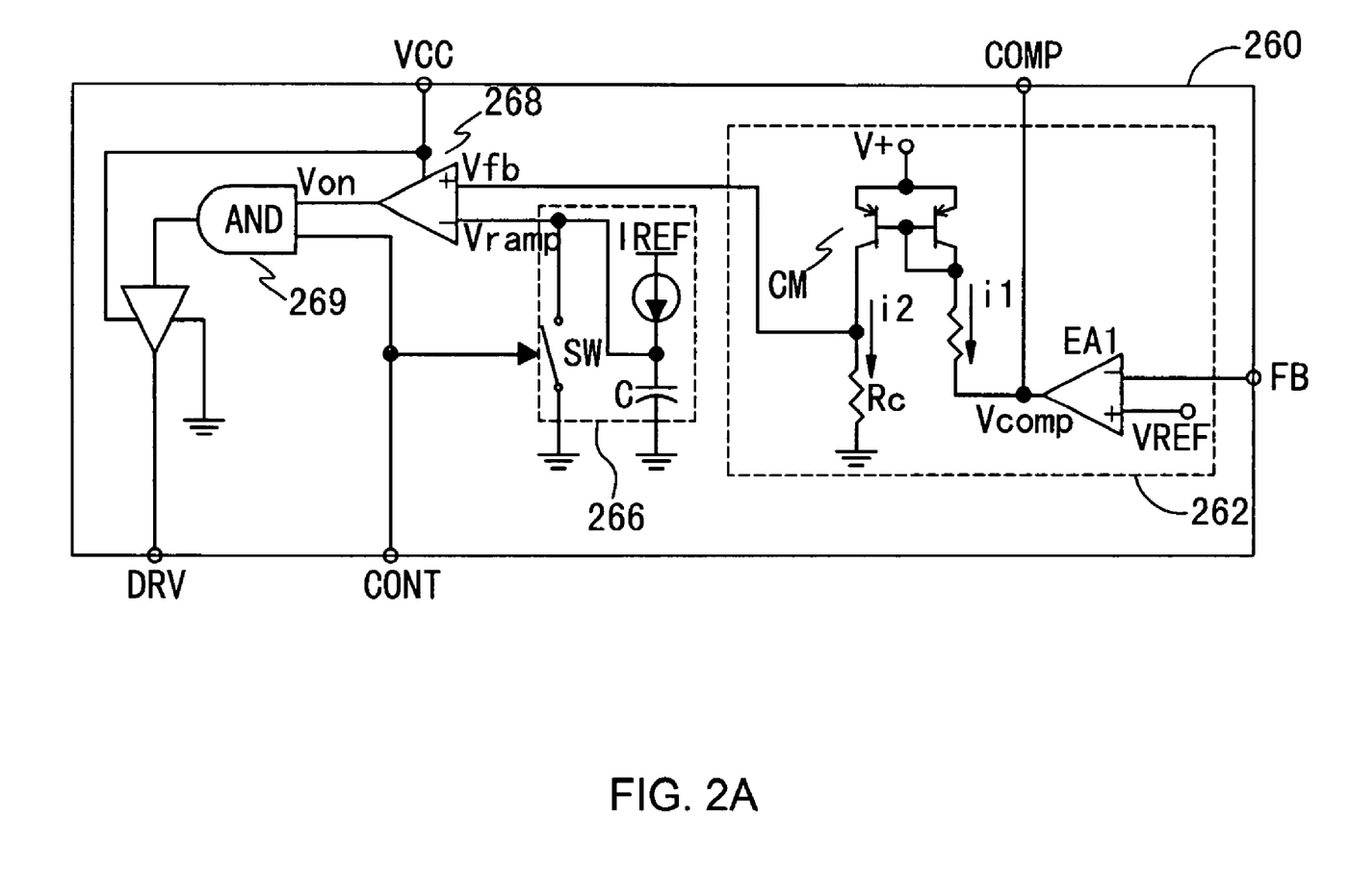
FIG. 2A is a circuit diagram showing the secondary side post regulator circuit in FIG. 2 in accordance with a preferred embodiment of the present invention.

FIG. 2A is a circuit diagram showing the secondary side post regulator circuit 260 in FIG. 2 in accordance with a preferred embodiment of the present invention. As shown, the secondary side post regulator circuit 260 has a transforming circuit 262, a ramp generator 266, a comparator 268, and an AND gate 269. The transforming circuit 262 receives the feedback signal FB from the high-level output circuit 240 and generates a feedback voltage Vfb accordingly. The voltage level of the feedback voltage Vfb is positively related to that of the feedback signal FB, and the voltage level of the feedback signal FB is positively related to that of the high output voltage Vo2.

In the present embodiment, the transforming circuit 262 has an error amplifier EA1, a current mirror CM, and a resistor Rc. The inverted input and the non-inverted input of the error amplifier EA1 receive the feedback signal FB and a reference voltage signal VREF respectively so as to generate a comparing voltage Vcomp at the output. The voltage level of the comparing voltage Vcomp decides the amount of input current i1 as well as the respective output current i2 of the current mirror CM. The resistor Rc has one end connected to the current mirror CM and the other end grounded. The output current i2 from the current mirror CM flows through the resistor Rc to have the upper end of the resistor Rc showing the feedback voltage Vfb. When the voltage level of the high output voltage Vo2 is raised, a greater input current i1 is formed at the input of the current mirror CM because of a feedback signal FB with higher voltage level, and a greater output current i2 is resulted to raise the voltage level of the feedback voltage Vfb.

The ramp generator 266 generates a ramp signal Vramp according to the detecting signal CONT from the low-voltage output circuit 220. The cycle of the detecting signal CONT is identical to that of the ramp signal Vramp. In the present embodiment, the ramp generator 266 has a switch SW, a current source IREF, and a capacitor C. The capacitor C is serially connected between the current source IREF and a grounded end. The switch SW has one end grounded and the other end connected to the junction between the capacitor C and the current source IREF. The ramp signal Vramp is generated at the upper side of the capacitor C. When the detecting signal CONT is high, the switch SW is off and the current source IREF keeps charging the capacitor C to raise the voltage level at the upper side of the capacitor C. Then, when the detecting signal CONT becomes low, the switch SW is turned on to form a discharging path releasing the energy stored in the capacitor C to have the voltage level at the upper side of the capacitor C drop to zero rapidly. The above mentioned operation is repeated and thus the ramp signal Vramp is generated at the inverted input of the comparator 268.

The comparator 268 generates an on-time signal Von according to the ramp signal Vramp and the feedback voltage Vfb. Duration of the on-time signal at high level is positively related to the voltage level of the feedback voltage Vfb. In the present embodiment, the non-inverted input of the comparator 268 receives the feedback voltage Vfb and the inverted input thereof receives the ramp signal Vramp. When the level of the feedback voltage Vfb is greater than that of the ramp signal Vramp, the on-time signal Von is high, and when the level of the feedback voltage Vfb is lower than that of the ramp signal Vramp, the on-time signal Von is low. The duration of the on-time signal Von at high level depends on the level of the feedback voltage Vfb.

The AND gate 269 receives the detecting signal CONT and the on-time signal Von to generate a conduction signal DRV for adjusting on-time of the high-voltage output switch Q2 so as to control the level of the high output voltage Vo2. The conduction signal DRV is high to turn on the high-voltage output switch Q2 only when both the on-time signal Von and the detecting signal CONT are high.

In the present embodiment, the upward-shifted voltage level of the high output voltage Vo2 can be pulled down by turning on the high-voltage output switch Q2 to have the energy stored in the high-voltage output capacitor C2 released to the low-voltage output circuit 220. In addition, the higher the level of the high output voltage Vo2, the longer the high-voltage output switch Q2 being turned on to release energy to the low-voltage output circuit 220. However, the duty cycle of the high-voltage output switch Q2 has a limitation that the high-voltage output switch Q2 and the main switch Q cannot be turned on at the same time. In the present embodiment, on-time of the low-voltage output switch Q1 is defined as the upper limit of on-time of the high-voltage output switch Q2.

As the voltage level of the high output voltage Vo2 decreased, on-time of the high-voltage output switch Q2 is reduced or even becomes zero. However, because the high-voltage output switch Q2 is connected in parallel with an interior diode d2, which acts as a conducting path when the high-voltage output switch Q2 is turned off, the high-voltage output capacitor C2 can be charged by the second secondary winding LH through the diode d2 to stabilize the level of the high output voltage Vo2 even if the high-voltage output switch Q2 is turned off.

Figure 2B:
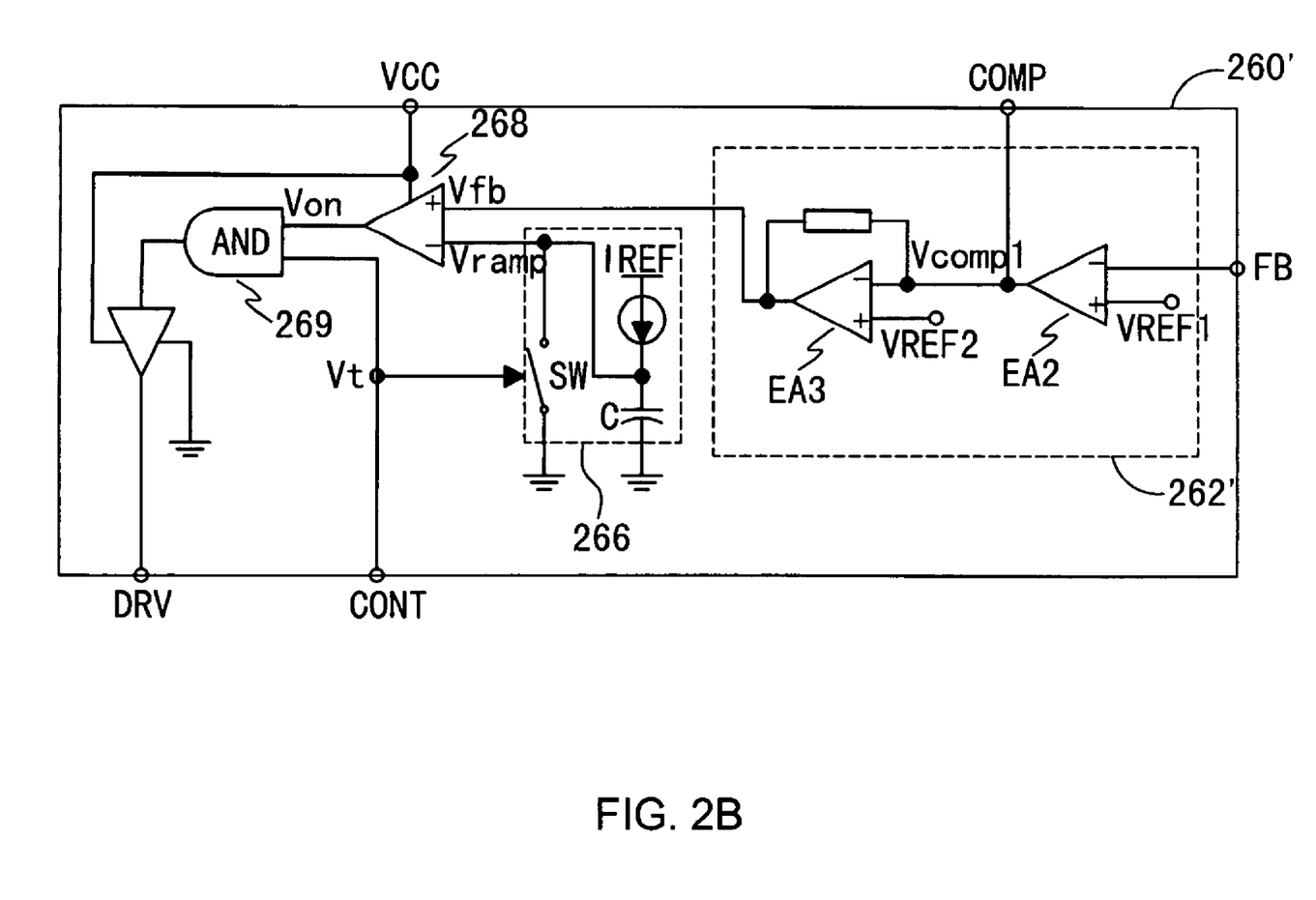
FIG. 2B is a circuit diagram showing the secondary side post regulator circuit in FIG. 2 in accordance with another preferred embodiment of the present invention.

FIG. 2B is a circuit diagram of the secondary side post regulator circuit of FIG. 2 in accordance with another preferred embodiment of the present invention. The transforming circuit 262' of the secondary side post regulator circuit 260' in the present embodiment has two error amplifiers EA2 and EA3. The error amplifier EA2 has an inverted input receiving the feedback signal FB and a non-inverted input receiving a first reference voltage VREF1 so as to output a first comparing voltage Vcomp1. The error amplifier EA3 has an inverted input receiving the first comparing voltage Vcomp1 and a non-inverted input receiving a second reference voltage VREF2 so as to generate the feedback voltage Vfb at the output.

Figure 4:
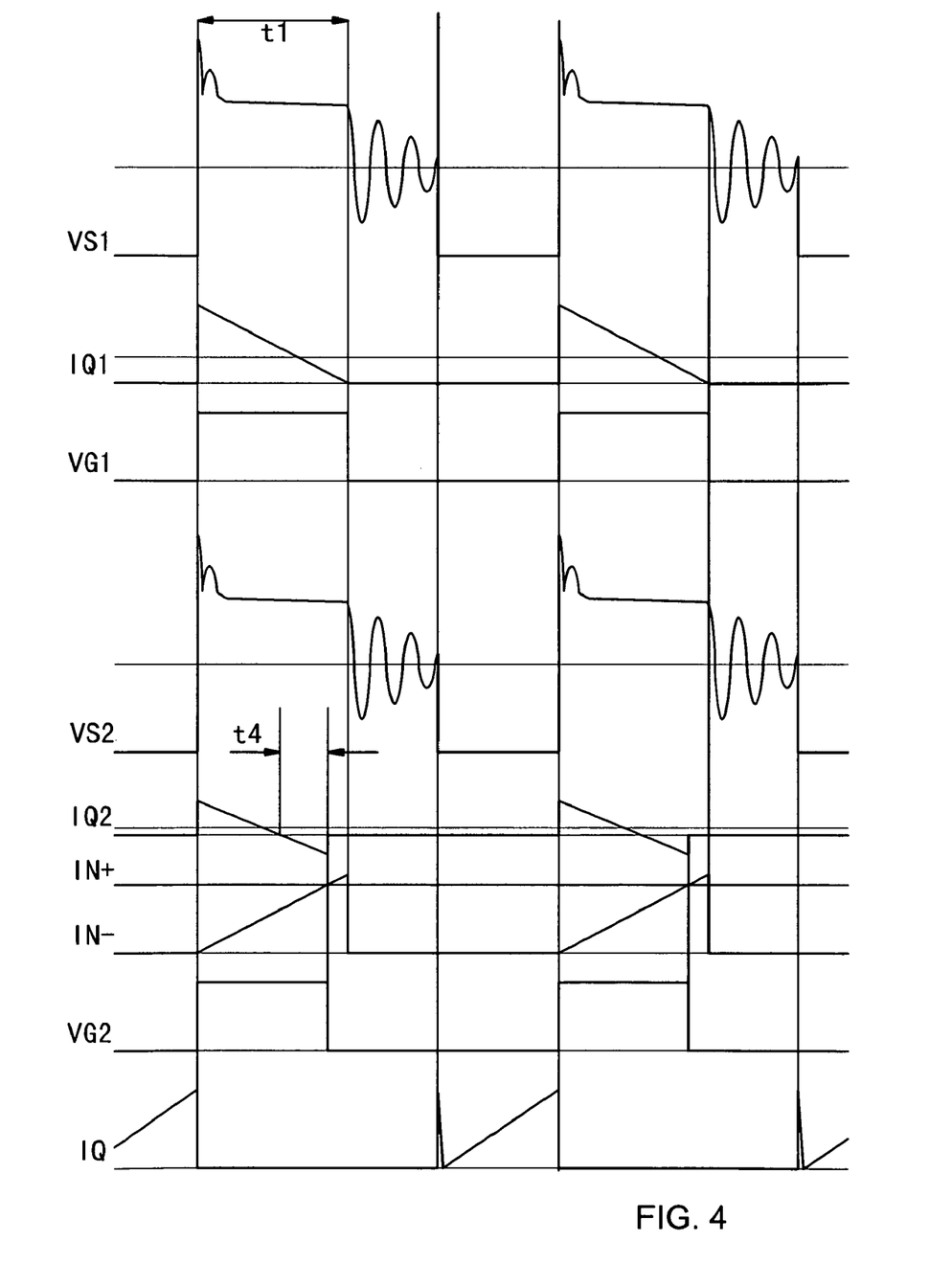
FIG. 4 is a diagram showing the waveforms of the signals generated by the flyback power converter with multiple outputs in accordance with a preferred embodiment of the present invention.

FIG. 4 is a timing sequence diagram showing the waveforms of the signals in the flyback power converter 200 of FIG. 2 in accordance with a preferred embodiment of the present invention. In the present embodiment, the flyback power converter 200 is operated under discontinuous mode (DCM) and the high-voltage output circuit 240 is lightly loaded. As shown, VS1 is voltage drop across the first secondary winding LL, VS2 is voltage drop across the second secondary winding LH, IQ1 is current flowing from the first secondary winding LL to the low-voltage output capacitor C1, IQ2 is current flowing from the second secondary winding LH to the high-voltage output capacitor C2, VG1 is gate voltage of the low-voltage output switch Q1, VG2 is gate voltage of the high-voltage output switch Q2, IQ is current flowing from the primary winding L0 to the main switch Q, IN+ is the voltage level at the non-inverted input of the comparator 268, which is identical to the voltage level of the feedback voltage Vfb, and waveform IN− is the voltage level at the inverted input of the comparator 268, which is identical to the voltage level of the ramp signal Vramp.

During time period t1, after the low-voltage output switch Q1 and the high-voltage output switch Q2 are turned on (gate voltages VG1 and VG2 are high), the energy stored in the first secondary winding LL and the second secondary winding LH is released to the output capacitors C1 and C2 respectively by the way of current flows IQ1 and IQ2. The current flows IQ1 and IQ2 reduce gradually. When the current flow IQ1 becomes zero, the low-voltage output switch Q1 is turned off immediately (gate voltage VG1 becomes low).

As shown, because the high-voltage output circuit 240 is lightly loaded, the current flow IQ2 becomes zero earlier. That is, as the current flow IQ2 becomes zero, there may be a positive current flow IQ1 on the low-voltage output circuit 220. During time period t4, after the current flow IQ2 becomes zero, if the high-voltage output switch Q2 remains conducting (gate voltage VG2 is high), the direction of the current flow IQ2 would be inverted, which flows from the high-voltage output capacitor C2 through the high-voltage output switch Q2 to the low-voltage output capacitor C1 until the high-voltage output switch Q2 being turned off.

Also referring to FIG. 2A, the conduction signal DRV becomes low to turn off the high-voltage output switch Q2 in two conditions. The first one is the level of the feedback voltage Vfb being lower than the ramp signal Vramp. This condition is decided mainly by the voltage level of the high output voltage Vo2. The second one is the gate voltage VG1 of the low-voltage output switch Q1 becoming low. This limitation is for preventing the main switch Q and the high-voltage output switch Q2 from being turned on at the same time.

Referring to FIG. 1, in the traditional power converter with multiple outputs 100, the voltage level of the output voltage V2 other than the main output voltage V1 is stabilized by using a regulator circuit 144, such as a LDO circuit. However, the regulator circuit 144 may cause significant energy loss during voltage-stabilization to result in the decreasing of energy efficiency or even have the power converter being disqualified for the energy regulations. In addition, as the first output circuit is heavily loaded, the voltage level accessed by the regulator circuit 144 raises, which may further increase energy loss during voltage stabilization for the huge potential difference between the input and the output of the regulator circuit 144.

In contrast, referring to FIG. 2, the flyback power converter 200 of the present invention adjusts on-time of the high-voltage output switch Q2 by using the secondary side post regulator circuit 260 to have the energy stored in the high-voltage output capacitor C2 flowing through the second secondary winding LH and the high-voltage output switch Q2 to the low-voltage output circuit 220. Therefore, when the high-voltage output circuit 240 is lightly loaded to result in voltage rising of high output voltage Vo2, the secondary side post regulator circuit 260 can pull down the level of the high output voltage Vo2 effectively by transferring the energy stored in the high-voltage output capacitor C2 to the low-voltage output circuit 220 so as to provide a stable output voltage. Moreover, because the energy stored in the high-voltage output capacitor C2 can be released to the low-voltage output circuit 220 through the high-voltage output switch Q2 to reduce the voltage level of the high output voltage Vo2, energy loss during voltage stabilization of the high output voltage Vo2 can be significantly reduced. In addition, when the low-voltage output circuit 220 is heavily loaded, the energy from the high-voltage output capacitor C2 is helpful for raising the voltage level of the low output voltage Vo1 to have the low output voltage Vo1 stabilized faster.

Moreover, referring to FIG. 1, the traditional flyback power converter 100 with multiple outputs uses diodes to prevent the energy stored in the capacitors from flowing back to the secondary windings L1 and L2. In contrast, referring to FIG. 2, the low-voltage output circuit 220 and the high-voltage output circuit 240 of the present embodiment adopt the electronic switches Q1 and Q2 with low on-resistance to replace the diodes. Thus, energy loss from the rectifier diodes can be effectively reduced.

Figure 3:
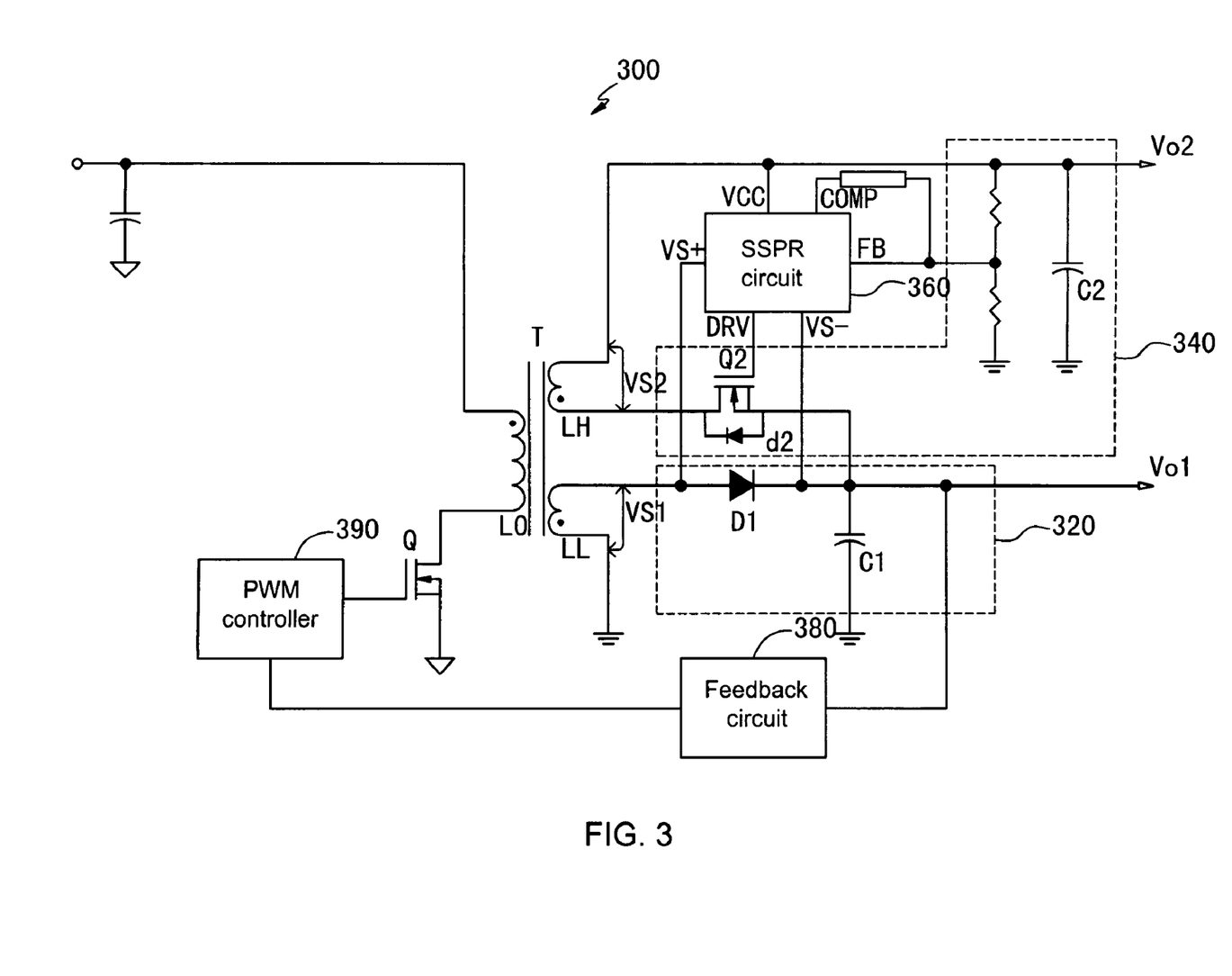
FIG. 3 is a circuit diagram of a flyback power converter with multiple outputs in accordance with another preferred embodiment of the present invention.

FIG. 3 is a circuit diagram showing a flyback power converter with multiple outputs 300 in accordance with another preferred embodiment of the present invention. In contrast with the flyback power converter 200 of FIG. 2, the low-voltage output circuit 320 in the present embodiment uses a diode D1 as a rectifier unit to replace the low-voltage output switch Q1 of FIG. 2. The secondary side post regulator circuit 360 detects the level of both sides of the diode D1 (the levels at VS+ and VS− as shown) to judge whether the diode D1 is positively or negatively biased so as to decide if the first secondary winding LL is releasing energy to the capacitor C1.

Figure 3A:
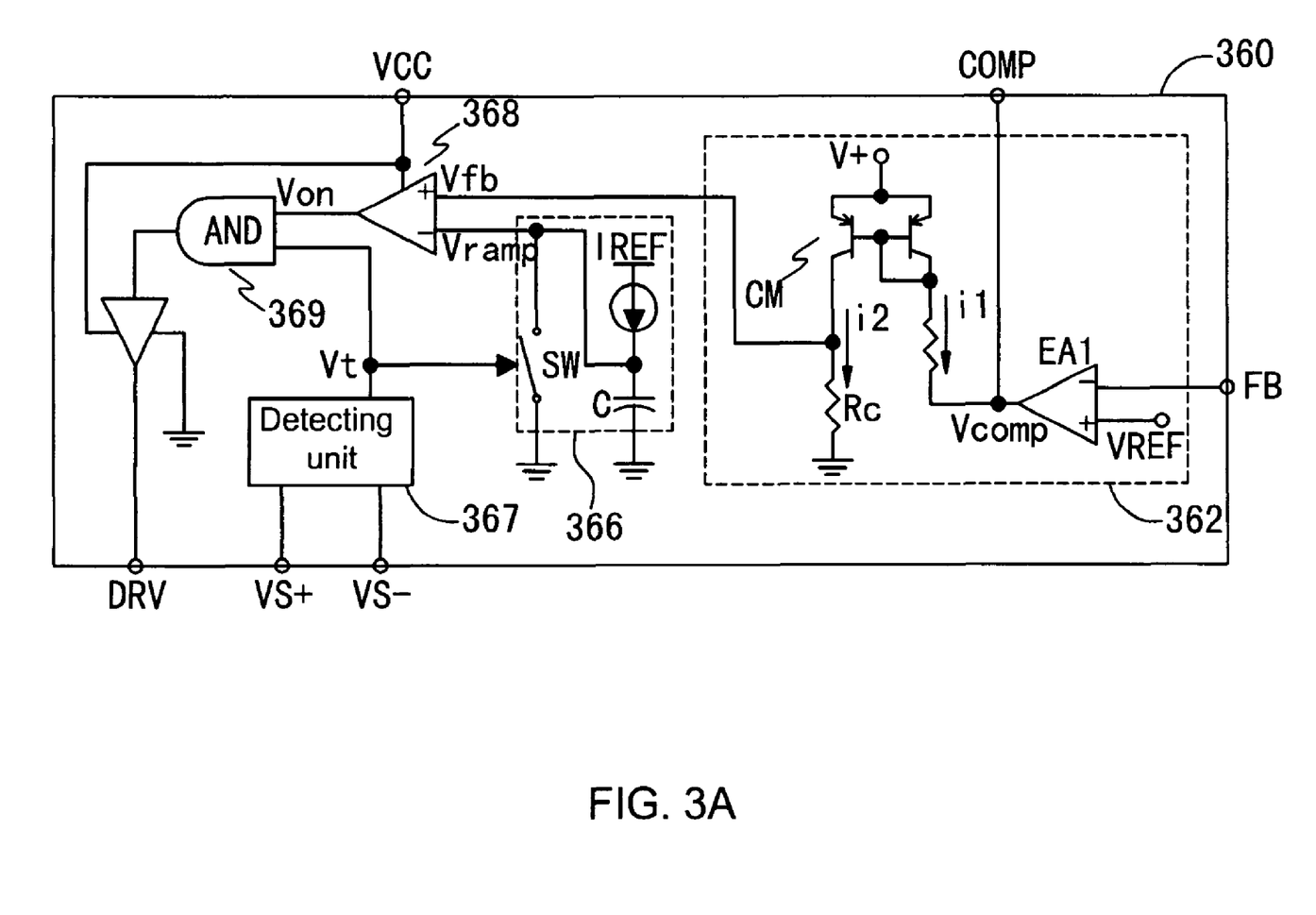
FIG. 3A is a circuit diagram showing the secondary side post regulator circuit in FIG. 3 in accordance with a preferred embodiment of the present invention.

FIG. 3A is a circuit diagram of the secondary side post regulator circuit 360 of FIG. 3 in accordance with a preferred embodiment of the present invention. In contrast with the embodiment shown in FIG. 2A, the secondary side post regulator circuit 360 in the present embodiment has a detecting unit 367, which detects voltage drop across the diode D1 through two pins VS+ and VS− and generates a detecting signal Vt accordingly. The ramp generator 366 generates the ramp signal Vramp according to the detecting signal Vt. The AND gate 369 receives the detecting signal Vt and the on-time signal Von from the comparator 368 to generate the conduction signal DRV to adjust on-time of the high-voltage output switch Q2.

While the preferred embodiments of the present invention have been set forth for the purpose of disclosure, modifications of the disclosed embodiments of the present invention as well as other embodiments thereof may occur to those skilled in the art. Accordingly, the appended claims are intended to cover all embodiments which do not depart from the spirit and scope of the present invention.

What is claimed is:

1. A flyback power converter with multiple outputs comprising:
   a transformer, having a primary winding, a first secondary winding, and a second secondary winding;
   a primary side circuit, having a main switch coupled to the primary winding;
   a low-voltage output circuit, which is coupled to the first secondary winding, having a low-voltage output capacitor and a rectifier unit to generate a low output voltage;
   a high-voltage output circuit, which is coupled to the second secondary winding, having a high-voltage output switch and a high-voltage output capacitor to generate a high output voltage; and
   a secondary side post regulator circuit, adjusting an on-time of the high-voltage output switch according to a feedback signal responsive to the high output voltage to have energy stored in the high-voltage capacitor transferred to the low-voltage output capacitor for reducing a level of the high output voltage;
   wherein the secondary side post regulator circuit limits a maximum on-time of the high-voltage output switch according to a detecting signal from the low-voltage output circuit, the detecting signal corresponding to a conducting condition of the rectifier unit and thereby conduction of the high-voltage output switch being only within a time interval during conduction of the rectifier unit.

2. The flyback power converter with multiple outputs of claim 1, wherein the rectifier unit has a diode and the detecting signal represents a voltage drop across the diode.

3. The flyback power converter with multiple outputs of claim 1, wherein the rectifier unit has a low-voltage output switch and the detecting signal represents a gate voltage turning on the low-voltage output switch.

4. The flyback power converter with multiple outputs of claim 1, further comprising a feedback circuit, utilized for detecting the low output voltage to control an on-time of the main switch.

5. The flyback power converter with multiple outputs of claim 1, wherein the secondary side post regulator circuit has:
a ramp generator, generating a ramp signal according to the detecting signal; and
a comparator, receiving the ramp signal and a feedback voltage corresponding to the feedback signal to generate an on-time signal for adjusting the on-time of the high-voltage output switch;
wherein a level of the feedback voltage is positively related to that of the feedback signal and a length of the on-time signal at high level is positively related to the level of the feedback voltage.

6. The flyback power converter with multiple outputs of claim 5, wherein the secondary side post regulator circuit further has an AND gate, which generates a conduction signal according to the detecting signal and the on-time signal to control the high-voltage output switch.

7. The flyback power converter with multiple outputs of claim 5, wherein the secondary side post regulator circuit further has a transforming circuit, and the transforming circuit has an error amplifier for receiving the feedback signal and a reference voltage to generate the feedback voltage.

8. The flyback power converter with multiple outputs of claim 7, wherein the transforming circuit has two error amplifiers, one of the two error amplifiers receives the feedback signal to generate a comparing voltage, and the other one of the two error amplifiers receives the comparing voltage to generate the feedback voltage.

9. The flyback power converter with multiple outputs of claim 7, wherein the transforming circuit has a current mirror and a resistor, an input current of the current mirror is decided by an output voltage of the error amplifier, and the resistor is utilized for transforming a respective output current of the current mirror into the feedback voltage.

10. The flyback power converter with multiple outputs of claim 5, wherein the ramp generator has a current source, a capacitor, and a switch, the current source is utilized for charging the capacitor, the switch, which is controlled by the detecting signal, has one end connected to a ground and the other end connected to the capacitor for establishing a discharging path to release energy stored in the capacitor.

11. The flyback power converter with multiple outputs of claim 1, wherein the on-time of the high-voltage output switch is positively related to a level of the high output voltage.

12. The flyback power converter with multiple outputs of claim 1, further comprising a diode connected to the high-voltage switch in parallel, wherein when the high-voltage switch is turned off, the diode forms a conduction path for the second secondary winding to charge the high-voltage output capacitor.

13. A secondary side post regulator circuit applied in a flyback power converter with multiple outputs, which has a transformer, a low-voltage output circuit for generating a low output voltage, and a high-voltage output circuit for generating a high output voltage, wherein the low-voltage output circuit has a low-voltage output capacitor and a rectifier unit and is coupled to a first secondary winding of the transformer, and the high-voltage output circuit has a high-voltage output capacitor and a high-voltage output switch and is coupled to a second secondary winding of the transformer, the secondary side post regulator circuit comprising:
a ramp generator, generating a ramp signal according to a detecting signal from the low-voltage output circuit; and
a comparator, generating an on-time signal to control an on-time of the high-voltage output switch according to the ramp signal and a feedback signal from the high-voltage output circuit to have energy stored in the high-voltage output capacitor transferred to the low-voltage output capacitor through the conducted high-voltage output switch;
wherein the secondary side post regulator circuit limits a maximum on-time of the high-voltage output switch according to the detecting signal from the low-voltage output circuit, the detecting signal corresponding to a conducting condition of the rectifier unit and thereby conduction of the high-voltage output switch being only within a time interval during conduction of the rectifier unit.

14. The secondary side post regulator circuit of claim 13, further comprising an AND gate, receiving the detecting signal and the on-time signal and generating a conduction signal accordingly to control the high-voltage output switch.

15. The secondary side post regulator circuit of claim 13, further comprising a transforming circuit, utilized for transforming the feedback signal into a feedback voltage, which has a level positively related to that of the feedback signal, and the comparator receiving the ramp signal and the feedback voltage to generate the on-time signal.

16. The secondary side post regulator circuit of claim 15, wherein a length of the on-time signal at high level is positively related to the level of the feedback voltage.

17. The secondary side post regulator circuit of claim 15, wherein the transforming circuit has an error amplifier, which compares the feedback signal with a reference voltage to generate the feedback voltage.

18. The secondary side post regulator circuit of claim 17, wherein the transforming circuit further has a current mirror and a resistor, an input current of the current mirror is decided according to an output voltage of the error amplifier, and the resistor is utilized for transforming a respective output current of the current mirror into the feedback voltage.

19. The secondary side post regulator circuit of claim 17, wherein the transforming circuit has two error amplifiers, one of the two error amplifiers receives the feedback signal to generate a comparing voltage, and the other one of the two error amplifiers receives the comparing voltage to generate the feedback voltage.

20. The secondary side post regulator circuit of claim 13, wherein a level of the feedback signal is positively related to that of the high output voltage.

21. The secondary side post regulator circuit of claim 13, wherein the rectifier unit has a diode and the detecting signal represents a voltage drop across the diode.

22. The secondary side post regulator circuit of claim 13, wherein the rectifier unit has a low-voltage output switch and the detecting signal represents a gate voltage turning on the low-voltage output switch.

23. The secondary side post regulator of claim 13, wherein a level of the low output voltage is controlled through a primary side of the flyback power converter with multiple outputs.

24. The secondary side post regulator circuit of claim 13, wherein the ramp generator has a current source, a capacitor, and a switch, the switch is controlled by the detecting signal and has one end connected to a ground and the other end connected to the capacitor for establishing a discharging path to release energy stored in the capacitor.

* * * * *